US011762742B2

United States Patent
McLaughlin et al.

(10) Patent No.: US 11,762,742 B2
(45) Date of Patent: Sep. 19, 2023

(54) PROCESS CONTROL SYSTEM WITH DIFFERENT HARDWARE ARCHITECTURE CONTROLLER BACKUP

(71) Applicant: Honeywell International Inc., Morris Plains, NJ (US)

(72) Inventors: Paul Francis McLaughlin, Morris Plains, NJ (US); Jason Thomas Urso, Morris Plains, NJ (US); James Michael Schreder, Morris Plains, NJ (US); Joseph Pradeep Felix, Morris Plains, NJ (US); Michael James Waynick, Morris Plains, NJ (US); Elliott Harry Rachlin, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 196 days.

(21) Appl. No.: 16/836,556

(22) Filed: Mar. 31, 2020

(65) Prior Publication Data
US 2021/0302927 A1 Sep. 30, 2021

(51) Int. Cl.
*G06F 11/20* (2006.01)
*G06F 11/16* (2006.01)
*G06F 9/455* (2018.01)

(52) U.S. Cl.
CPC ........ *G06F 11/2028* (2013.01); *G06F 9/4552* (2013.01); *G06F 9/45508* (2013.01);
(Continued)

(58) Field of Classification Search
CPC ............. G06F 11/1658; G06F 11/2005; G06F 11/2025; G06F 11/2028; G06F 11/203;
(Continued)

(56) References Cited

U.S. PATENT DOCUMENTS

| 4,133,027 A | 1/1979 | Hogan |
| 4,888,726 A | 12/1989 | Struger et al. |

(Continued)

FOREIGN PATENT DOCUMENTS

| CN | 103354190 A | 10/2013 |
| CN | 104241972 A | 12/2014 |

(Continued)

OTHER PUBLICATIONS

Wikipedia, "DNA Rail"; Retrieved from "https://en.wikipedia.org/w/index.php?title=DIN_rail&oldid=946791884", Retrieved on: Sep. 23, 2020 (4 pages total).

(Continued)

*Primary Examiner* — Bryce P Bonzo
*Assistant Examiner* — Albert Li
(74) *Attorney, Agent, or Firm* — John Maldjian; Stevens & Lee PC

(57) ABSTRACT

A process control system includes first type and second type controllers having different hardware architectures coupled together by a redundancy network for providing a controller pool. Primary application modules (AMs) are coupled to the controller platforms by a plant-wide network. The controller platforms are coupled by an input/output (I/O) mesh network to I/O devices to provide an I/O pool coupled to field devices coupled to processing equipment. A translating device translates states and values from one of the primary AMs running on a first type controller to generate a backup AM having an instruction set compatible with the second type controller. A controller application module orchestrator (CAMO) extends synchronization to the second type controller, makes the backup AM available to the second type controller, and then switches to utilize the second type controller as an active controller running the process.

18 Claims, 3 Drawing Sheets

(52) U.S. Cl.
CPC ...... G06F 11/1658 (2013.01); G06F 11/2005 (2013.01); G06F 11/2025 (2013.01)

(58) Field of Classification Search
CPC ...... G06F 9/4552; G06F 8/52; G06F 9/45508; G05B 19/4184
See application file for complete search history.

(56) References Cited

U.S. PATENT DOCUMENTS

| | | |
|---|---|---|
| 4,958,270 A | 9/1990 | McLaughlin et al. |
| 5,088,021 A | 2/1992 | McLaughlin et al. |
| 5,361,198 A | 11/1994 | Harmon et al. |
| 5,432,927 A | 7/1995 | Grote et al. |
| 5,546,301 A | 8/1996 | Agrawl et al. |
| 5,933,347 A | 8/1999 | Cook et al. |
| 5,963,448 A | 10/1999 | Flood et al. |
| 6,008,985 A | 12/1999 | Lake et al. |
| 6,088,679 A | 7/2000 | Barkley |
| 6,138,049 A | 10/2000 | McLaughlin et al. |
| 6,170,044 B1 | 1/2001 | McLaughlin et al. |
| 6,272,386 B1 | 8/2001 | McLaughlin et al. |
| 6,442,663 B1* | 8/2002 | Sun .......... G06F 9/54 711/202 |
| 6,560,330 B2 | 5/2003 | Gabriel |
| 7,237,148 B2 | 6/2007 | Czajkowski et al. |
| 7,313,448 B2 | 12/2007 | Detrich et al. |
| 7,434,047 B2 | 10/2008 | Sharma |
| 7,436,797 B2 | 10/2008 | Shepard et al. |
| 7,515,972 B2 | 4/2009 | Kumar et al. |
| 7,555,752 B2 | 6/2009 | Groot et al. |
| 7,577,575 B1 | 8/2009 | Donner et al. |
| 7,630,777 B2 | 12/2009 | Rudnick et al. |
| 8,280,530 B2 | 10/2012 | Kase |
| 8,570,922 B2 | 10/2013 | Pratt, Jr. et al. |
| 8,676,219 B2 | 3/2014 | Pratt, Jr. et al. |
| 8,948,067 B2 | 2/2015 | Chernoguzov et al. |
| 9,128,479 B2 | 9/2015 | Reichard et al. |
| 9,665,089 B2 | 5/2017 | Schreder et al. |
| 9,843,624 B1 | 12/2017 | Taaghot |
| 9,875,207 B2 | 1/2018 | Lv et al. |
| 9,935,828 B2 | 4/2018 | Tal et al. |
| 9,873,346 B2 | 5/2018 | McLaughlin et al. |
| 9,990,286 B1 | 6/2018 | McLaughlin et al. |
| 10,175,682 B2 | 1/2019 | Peake et al. |
| 10,176,606 B2 | 1/2019 | Jammikunta et al. |
| 10,178,177 B2 | 1/2019 | McLaughlin et al. |
| 10,237,712 B2 | 3/2019 | Gopalakrishnan et al. |
| 10,296,515 B2 | 5/2019 | Nikhra et al. |
| 10,348,704 B2 | 7/2019 | Figueira |
| 10,354,343 B2 | 7/2019 | Bodanapu et al. |
| 10,441,832 B1 | 10/2019 | Trivelpiece et al. |
| 10,565,046 B2 | 2/2020 | Tran et al. |
| 10,997,113 B1 | 5/2021 | Reineke et al. |
| 11,036,656 B2 | 6/2021 | Mclaughlin et al. |
| 2003/0028538 A1 | 2/2003 | Eikenbery |
| 2004/0158713 A1 | 8/2004 | Aneweer et al. |
| 2004/0233237 A1 | 11/2004 | Randow |
| 2005/0022065 A1 | 1/2005 | Dixon |
| 2005/0022078 A1 | 1/2005 | Subramanian |
| 2005/0276233 A1 | 12/2005 | Shepard et al. |
| 2006/0130021 A1 | 6/2006 | Plum et al. |
| 2006/0236198 A1 | 10/2006 | Lintz et al. |
| 2007/0100472 A1 | 5/2007 | Johnson et al. |
| 2008/0015714 A1 | 1/2008 | Rudnick et al. |
| 2008/0074998 A1 | 3/2008 | Becker et al. |
| 2008/0120125 A1 | 5/2008 | Chavez |
| 2009/0031403 A1 | 1/2009 | Huang |
| 2009/0222654 A1* | 9/2009 | Hum .......... G06F 1/3296 713/100 |
| 2010/0064137 A1 | 3/2010 | Mcgrew et al. |
| 2010/0271989 A1 | 10/2010 | Chernoguzov et al. |
| 2010/0315298 A1 | 12/2010 | Biswas et al. |
| 2011/0178611 A1 | 7/2011 | Daraiseh et al. |
| 2011/0258433 A1 | 10/2011 | Pulini et al. |
| 2012/0076007 A1 | 3/2012 | Nelson |
| 2012/0078391 A1 | 3/2012 | Zornio et al. |
| 2012/0117416 A1 | 5/2012 | Mclaughlin |
| 2012/0300420 A1 | 11/2012 | Muldowney et al. |
| 2013/0268799 A1 | 10/2013 | Mestery et al. |
| 2014/0032366 A1 | 1/2014 | Spitz et al. |
| 2014/0068579 A1 | 3/2014 | Dawson et al. |
| 2014/0173246 A1 | 6/2014 | Sandstrom |
| 2014/0173336 A1* | 6/2014 | Bennah .............. G06F 11/3433 714/4.12 |
| 2014/0245077 A1 | 8/2014 | Kanso et al. |
| 2014/0298091 A1 | 10/2014 | Carlen et al. |
| 2015/0018977 A1 | 1/2015 | Law et al. |
| 2015/0019191 A1 | 1/2015 | Maturana et al. |
| 2015/0149767 A1 | 5/2015 | Oualha et al. |
| 2015/0154136 A1 | 6/2015 | Markovic et al. |
| 2015/0215300 A1 | 7/2015 | Buonacuore et al. |
| 2015/0278144 A1 | 10/2015 | McLaughlin et al. |
| 2015/0323910 A1 | 11/2015 | McLaughlin et al. |
| 2015/0341364 A1 | 11/2015 | Basso et al. |
| 2015/0378356 A1 | 12/2015 | Hefeeda et al. |
| 2016/0062350 A1 | 3/2016 | Prall et al. |
| 2016/0103431 A1* | 4/2016 | Ganapathi .............. G05B 15/02 700/20 |
| 2016/0139999 A1 | 5/2016 | Gabler et al. |
| 2016/0299497 A1* | 10/2016 | McLaughlin ...... G05B 19/4185 |
| 2016/0320759 A1 | 11/2016 | Macha et al. |
| 2016/0327923 A1 | 11/2016 | Papenbreer et al. |
| 2017/0126404 A1 | 5/2017 | Unagami et al. |
| 2017/0185055 A1 | 6/2017 | Nakajima et al. |
| 2017/0199515 A1 | 7/2017 | Bhat et al. |
| 2017/0228225 A1* | 8/2017 | Rachlin ..................... G06F 8/52 |
| 2017/0277607 A1 | 9/2017 | Samii et al. |
| 2017/0300024 A1 | 10/2017 | Nixon et al. |
| 2017/0359222 A1 | 12/2017 | Dutta et al. |
| 2018/0046487 A1 | 2/2018 | Matters et al. |
| 2018/0121843 A1 | 5/2018 | Connely, IV |
| 2018/0259923 A1 | 9/2018 | De et al. |
| 2018/0299873 A1 | 10/2018 | Chauvet et al. |
| 2018/0321662 A1 | 11/2018 | Nixon et al. |
| 2018/0324609 A1 | 11/2018 | Diancin |
| 2018/0364673 A1 | 12/2018 | Van et al. |
| 2019/0042378 A1 | 2/2019 | Wouhaybi et al. |
| 2019/0050342 A1 | 2/2019 | Drayton |
| 2019/0056719 A1 | 2/2019 | Ong |
| 2019/0102226 A1 | 4/2019 | Caldato et al. |
| 2019/0104437 A1 | 4/2019 | Bartfai-Walcott et al. |
| 2019/0140989 A1 | 5/2019 | Wise et al. |
| 2019/0174207 A1 | 6/2019 | Cella et al. |
| 2019/0179678 A1 | 6/2019 | Banerjee et al. |
| 2019/0245716 A1 | 8/2019 | Coombes et al. |
| 2019/0274084 A1 | 9/2019 | Daniels et al. |
| 2019/0324874 A1 | 10/2019 | Gill et al. |
| 2019/0340269 A1 | 11/2019 | Biernat et al. |
| 2019/0370118 A1 | 12/2019 | Salapura et al. |
| 2020/0012569 A1 | 1/2020 | Natanzon et al. |
| 2020/0026575 A1 | 1/2020 | Guim et al. |
| 2020/0029086 A1 | 1/2020 | Zou et al. |
| 2020/0103861 A1 | 4/2020 | Flood |
| 2020/0104153 A1 | 4/2020 | Shibayama et al. |
| 2020/0127411 A1 | 4/2020 | Pakimo et al. |
| 2020/0136943 A1 | 4/2020 | Banyai et al. |
| 2020/0236162 A1 | 7/2020 | Bouzon et al. |
| 2020/0253067 A1 | 8/2020 | Pakimo et al. |
| 2020/0310394 A1* | 10/2020 | Wouhaybi .............. H04L 67/125 |
| 2020/0313960 A1 | 10/2020 | Rosa-Bian et al. |
| 2020/0319623 A1 | 10/2020 | McLaughlin et al. |
| 2020/0333765 A1 | 10/2020 | Biernat et al. |
| 2021/0096759 A1 | 4/2021 | Thakkilapati et al. |
| 2021/0152495 A1 | 5/2021 | Craig et al. |
| 2022/0138335 A1 | 5/2022 | Rachlin |

FOREIGN PATENT DOCUMENTS

| | | |
|---|---|---|
| CN | 109522051 A | 3/2019 |
| EP | 0416891 A2 | 3/1991 |
| EP | 2184903 A1 | 5/2010 |
| EP | 3789834 A1 | 3/2021 |
| GB | 2404261 A | 1/2005 |

(56) References Cited

FOREIGN PATENT DOCUMENTS

| WO | 9423367 A1 | 10/1994 |
|---|---|---|
| WO | PCT/US94/03707 A1 | 10/1994 |
| WO | 2011041413 A1 | 4/2011 |
| WO | 2015169352 A1 | 11/2015 |
| WO | 2017064560 A1 | 4/2017 |
| WO | 2019227401 A1 | 12/2019 |

OTHER PUBLICATIONS

"Everything You Need To Know About DIN Rails", RS Components, downloaded Apr. 21, 2020, https://uk.rs-online.com Retrieved on: Sep. 23, 2020 (5 pages total).
Honeywell, High-Performance Process Manager Planning, HP02-500, Release 530, CE Compliant, Revision 05—Mar. 20, 1998 (330 pages total).
Arnold Offner, "Din-Rail in the Electrical Control Cabinet and Junction Box", Presented on Nov. 12, 2008 at the IEEE SC2 Committee Meeting in Tucson, Arizona. (13 pages total).
"DeltaV™ Virtualization—High Availability and Disaster Recover", DeltaV Distributed Control System, Whitepaper, Emerson Process Management, Oct. 2014 (10 pages total).
"Experion CEE-based Controllers and I/O Overview, Doc # EP03-290-400, Release # 400", Jul. 2010, Version 1.0 (retrieved from https://www.nexinstrument.com/assets/images/pdf/TK-PR.pdf on Sep. 4, 2020) (43 pages total).
Australian Examination Report dated Sep. 1, 2022, issued in connection with corresponding AU application No. 2021229183 (3 pages total).
European Examination Report dated Feb. 11, 2022, issued in connection with corresponding EP Application No. 20165415.9 (10 pages total).
Extended European Search Report dated Jul. 9, 2021 for corresponding EP Application No. 21164736.7 (8 pages total).
Extended European Search Report dated Aug. 20, 2021, issued in connection with corresponding European Patent Application No. 21165382.9 (10 pages total).
Extended European Search Report dated Jul. 27, 2020, issued in connection with corresponding European Patent Application No. 20165416.7 (9 pages total).
Extended European Search Report dated Jun. 29, 2021, issued in connection with corresponding European Patent Application No. 21156993.4 (8 pages total).
Extended European Search Report dated Nov. 18, 2021, issued in connection with corresponding European Patent Application No. 21177860.1 (8 pages total).
Extended European Search Report dated Oct. 23, 2020, issued in connection with corresponding European Patent Application No. 20180113.1 (8 pages total).
Extended European Search Report dated Sep. 21, 2021, issued in connection with corresponding European Patent Application No. 21164739.1 (8 pages total).
Indian Examination Report dated Feb. 14, 2022; issued in connection with corresponding Indian Application No. 202114012845 (7 pages total).
Indian Examination Report dated Feb. 7, 2022; issued in connection with corresponding Indian Application No. 202114013519 (6 pages total).
Cheatham, Jason A., John M. Emmert, and Stan Baumgart. "A survey of fault tolerant methodologies for FPGAs." ACM Transactions on Design Automation of Electronic Systems (TODAES) 11, No. 2 (2006): 501-533. (Year: 2006) (33 pages total).
T. Panhofer and M. Delvai, "Self-Healing Circuits for Space-Applications," 2007 International Conference on Field Programmable Logic and Applications, Amsterdam, Netherlands, 2007, pp. 505-506, doi: 10.1109/FPL.2007.4380701. (Year: 2007) (2 pages total).
M. R. Boesen, J. Madsen and D. Keymeulen, "Autonomous distributed self-organizing and self-healing hardware architecture—The eDNA concept," 2011 Aerospace Conference, Big Sky, MT, USA, 2011, pp. 1-13, doi: 10.1109/ AERO.2011.5747476. (Year: 2011) (13 pages total).
C Popa and A. Stan, "A self-healing single core architecture using dynamically reconfigurable devices," 2012 16th International Conference on System Theory, Control and Computing (ICSTCC), Sinaia, Romania, 2012, pp. 1-6. (Year: 2012) (6 pages total).
G. D. Mois, M. Hulea, S. Folea and L. Miclea, "Self-healing capabilities through wireless reconfiguration of FPGAs," 2011 9th East-West Design & Test Symposium (EWDTS), Sevastopol, Ukraine, 2011, pp. 22-27, doi: 10.1109/ EWDTS.2011.6116410. (Year: 2011) (6 pages total).
M. Balaz and S. Kristofik, "Generic Self Repair Architecture with Multiple Fault Handling Capability," 2015 Euromicro Conference on Digital System Design, Madeira, Portugal, 2015, pp. 197-204, doi: 10.1109/DSD.2015.118. (Year: 2015) (8pages total).
Yu-jen Huang, Da-ming Chang and Jin-fu Li, "A Built-In Redundancy-Analysis Scheme for Self-Repairable RAMs with Two-Level Redundancy," 2006 21st IEEE International Symposium on Defect and Fault Tolerance in VLSI Systems, Arlington, VA, USA, 2006, pp. 362-370, doi: 10.1109/DFT.2006.6. (Year: 2006) (9 pages total).
Indian Examination Report dated Apr. 11, 2022, issued in connection with corresponding Indian Application No. 202114041005 (8 pages total).
Extended European Search Report dated Mar. 10, 2022 issued in connection with corresponding EP Application No. 21195635.4 (18 pages total).
Extended European Search Report dated Mar. 21, 2022 issued in connection with corresponding EP Application No. 21205397.9 (9 pages total).

\* cited by examiner

PROCESS CONTROL SYSTEM WITH DIFFERENT HARDWARE ARCHITECTURE CONTROLLER BACKUP

CROSS-REFERENCE TO COPENDING APPLICATIONS

This application has subject matter related to co-pending application Ser. No. 16/459,264 entitled "CONTROLLER APPLICATION MODULE ORCHESTRATOR" that was filed on Jul. 1, 2019.

FIELD

Disclosed embodiments relate to process controllers for process control systems.

BACKGROUND

In deployments of conventional process control systems, also known as process automation systems, the entity which is hosting the control function and responsible for the related control calculations (such as proportional integral differential (PID) control calculations) is typically an embedded computer device/platform, typically described as being a process "controller." One example of a commercially available embedded controller is the C300 controller provided by Honeywell International.

Each controller comprises computing hardware generally including at least one processor or other computing device, and an associated memory. What is referred to herein as a "controller platform" comprises one controller or a pair of controllers in the case of a redundant controller, where the controller platform hosts in memory a control software "application module" (AM), such as the commercially available EXPERION control execution environment (CEE), also marketed by Honeywell International Inc. Each "controller platform" communicates in a level above with at least one server over a plant-wide network, and with levels below typically through an input/output (I/O) network to I/O devices, then to field devices comprising sensors and actuators that control a portion of the processing equipment in the plant.

In order to ensure a high level of control system availability, the controllers in a process control system are typically deployed in a scheme which provides hardware redundancy, specifically two controller platforms deployed to do the job of only one, specifically a "primary" controller which is actively executing the process control mission and a "backup" controller which is on standby, being ready to assume the control mission if there is a failure of the primary controller. Upon the failure of a primary controller in a redundant controller pair controller platform, non-redundant operation using the backup controller continues until a repair or replacement is made to the primary controller to restore the controller redundancy in the controller platform. The AMs are conventionally deployed in a ratio of 1:1 with the controller platforms. This means each controller platform, whether redundant or not, always hosts only one AM.

FIG. 1 shows a conventional process control system 100 with AMs in a 1:1 ratio with 3 controller platforms in the process control system 100 shown as controller platforms 110 and 120 being redundant controllers each having a controller pair 111, 112 and 121, 122, respectively, along with one other controller 130 shown being a single (non-redundant) controller. Each controller (110, 120, and 130) includes computing hardware 171 including a processor and an associated memory 172.

All of the controllers 110, 120, and 130 generally utilize only one specific hardware architecture, such as a PowerQUICC processor from Freescale Semiconductor or ARM processors (that were previously called an advanced reduced instruction set computer (RISC) processor). PowerQUICC and ARM processors have architectures that typically require fewer transistors than those with a complex instruction set computing (CISC) architecture, such as X86 processors from Intel Corporation found in most personal computers that have an X86 architecture. Accordingly, controllers principally due to utilizing relatively low cost and low power consumption processors, such as PowerQUICC or ARM processors, provide recognized advantages over processors such as those having an X86 architecture. "X86" as used herein and as generally used in the computing arts refers to any processor compatible with an instruction set referred to as the X86 instruction set, that currently utilizes a 32-bit processor and operating system (OS).

A dedicated (fixed) AM is stored (resides) in one of the respective memories 172 of each of the controller platforms. This is shown as AM 141 in memory 172 of controller 111 that provides an AM, and AM 142 which is analogous to AM 141 that provides an AM for the primary controller 121 and a backup AM that is a backup of the AM 141 stored in local memory for the redundant controller 122, and AM 143 provides an AM for controller 130 which can be AM for only a primary controller, or an AM for a primary controller and backup AM for a redundant controller.

The controller platforms 110, 120, 130 are each shown coupled by an I/O network shown as an 'I/O network' 140 for controlling a portion of the processing equipment 160 shown coupled through I/O devices 145 to field devices 150 that comprise sensors and actuators. There is also shown a plant-wide network 170 (e.g., such as an Ethernet network) between the controller platforms 110, 120, 130 and the server 180, and at least one Human-Machine Interface (HMI) 185 associated with the server 180.

When redundant controllers shown as redundant controller 110 and 120 are configured as in the process control system 100 shown in FIG. 1, the primary controller and backup controller can change roles, with the backup controller becoming the primary controller when the primary controller is disabled so that the dedicated AM for the controller platform can support a different controller. However, the dedicated AMs (such as AM 141 and AM 142 shown in FIG. 1) each always only support a fixed pair of controllers (AM 141 for controller platform 110 shown as a primary controller 111 and a secondary controller 112).

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize that a conventional process control system with AMs deployed in a dedicated (or fixed) 1:1 ratio to controller platforms, such as in the conventional process control system 100 shown in FIG. 1, lacks flexibility and has other significant limitations problems deploying AMs. A disclosed controller application module orchestrator (CAMO) provides flexibility in the numerical relationship between controller platforms and AMs which are software resources that are dynamically deployed to the controllers by the CAMO, such as in a ratio of 1:1, 1:N, N:N, where N>1. The CAMO generally comprises a software engine and is thus distributed, with the primary responsibility to manage the deployment and mapping of AMs to the controller platforms.

This Disclosure recognizes with newer process control system designs, with modern information technology (IT) concepts such as virtualization and containerization, coupled with specific design adaptations for those technologies relevant to control technology deployments available, AMs can be deployed to controller platforms in a more flexible manner as compared to conventionally always being fixed 1:1 with the controller platforms. Specifically, using a disclosed CAMO, the AMs are made available to any of the controller platforms in the controller pool so that the CAMO determines which specific controller has sufficient spare capacity to host and run the AM, and the AM is then deployed by the CAMO to that particular controller. The AM deployment flexibility to any of the controller platforms in the controller pool provides process control system advantages including allowing multiple AMs to run on one controller platform so that the user does not always need to add hardware when they expand the process control system.

Furthermore, disclosed AM deployment provides flexibility as to which of the controllers in the controller platform the AMs are run on. This can be a significant advantage being over the life expectancy of a plant which runs continuously, because there may be a need to add additional AMs to the set of existing/running AMs on a fixed set of controller platforms, and in order to host the new AMs, or the existing set of AMs needs to be rebalanced to better distribute the load on the available processor and memory resources of existing controller platforms.

Disclosed aspects also include aspects that enable the AMs to be deployed on controllers which conventionally can only utilize a single hardware architecture to now be able to also utilize controllers having 2 or more different hardware architectures, such as the PowerQUICC or ARM architecture used in C300 controllers, and also the X86 architecture. As used herein the term "different hardware architecture" also includes, for example, two or more generations of PowerQUICC or ARM processors, as well as two more generations of the X86 architecture. While PowerQUICC or ARM has the advantages described above, controllers using such processors typically have lower capacity in terms of central processing unit (CPU), memory and flash as they are typically designed with industrial parts to support deployment in harsh environments. The X86 architecture controllers typically comprise commercial off-the-shelf (COTS) hardware, which have capacity that is several magnitudes greater. This disclosed ability to utilize two more different hardware architectures enables a process control system including a controller pool including first type controllers having a first hardware architecture and an I/O pool to be extensible by being able to also utilize second type controller(s) having a second hardware architecture, thus further reducing the chance of loss by the process control system of the control mission.

As noted above the controllers having the first hardware architecture can comprise controllers utilizing a PowerQUICC or an ARM architecture, and the second hardware architecture can comprise a COTS controller platform, such as a platform that may utilize the X86 architecture. Through enabling translation, transfer and synchronization of AM state and value information disclosed herein, controller platforms having a different controller hardware architecture, referred to herein as second type controllers, such as COTS controllers, are capable of hosting the same AMs as the controllers referred to herein as first type controllers having the first hardware architecture.

One disclosed embodiment comprises a method comprising providing a process control system configured for running a process comprising a plurality of controller platforms including controllers comprising computing hardware and memory including first type controllers having a first hardware architecture and at least one second type controller including computing hardware and memory having a second hardware architecture different from the first type controllers coupled to one another by a redundancy network, where the controllers are configured for providing at least one controller pool. A plurality of primary AMs are coupled to the plurality controller platforms by a plant-wide network. There may also be controllers outside the controller pool, where any of the primary AMs can be deployed to controllers in the controller pool or outside the controller pool. The controller platforms are coupled by an I/O mesh network to I/O devices to provide an I/O pool coupled to field devices, that are coupled to processing equipment.

States and values are transferred from at least one of the primary AMs running on one of the first type controllers to a backup AM stored in a memory of the second type controller. This state and value transfer can further comprise translating the primary AM's current state and data information into a hardware architecture independent data format, so that the transferring comprises sending the hardware architecture independent format state and data information to the second type controller, where the second type controller can then perform a second translation comprising translating the hardware architecture independent data format information into a data format compatible with the second hardware architecture.

An alternative transfer mechanism can be to have a first hardware architecture (PowerQUICC or AIM) emulation layer provided on the second type controller (e.g., X86 hardware architecture) that emulates the first hardware architecture (e.g., having a PowerQUICC or ARM architecture), so that the state and data information transferred from the primary AM received in a memory accessible by the second type controller remains in a data format compatible with the first type controller (e.g., PowerQUICC or the ARM) architecture. In this case there is a translation performed by the emulation layer when the state and data information is accessed. There may also be an additional translation used to ensure that the state and data information from the primary AM is modified in a way so that is not specific to a particular version of the AM software before storing the backup AM in the memory accessible by the second type controller.

To ensure that the state and data information received from the primary AM is modified in a way so that is not specific to a particular version of the AM software before storing the backup AM, translation may still be utilized for specific memory addresses embedded within the state even with an emulation layer. This is because the exact location in memory where the state and data information is stored could be different between the two controllers especially when the controller hosting the primary AM and the controller hosting the secondary AM, and which has the second hardware architecture, may have significantly different memory capacities. A single controller with the second hardware architecture (e.g. X86) may host backup AMs for primary AMs from multiple other controllers having the first hardware architecture.

The backup AM is then extended to the second type controller by deploying the backup AM there. Switching is then performed to utilize the second type controller as an active controller while continuing to run the process.

DETAILED DESCRIPTION

Figure 1:
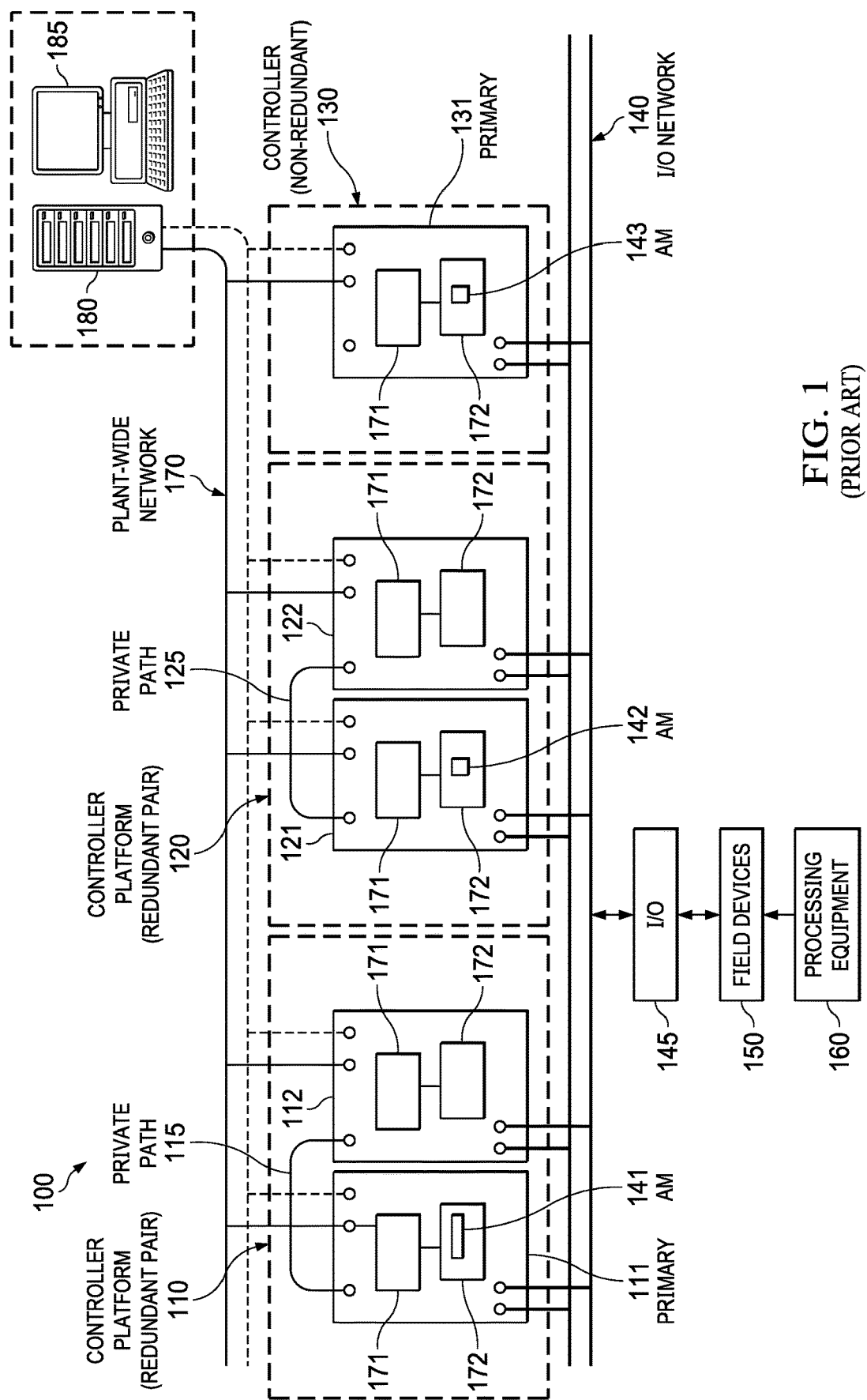
FIG. 1 shows a conventional process control system with AMs in a 1:1 ratio with the controller platforms in the process control system that shows 3 controllers, with 2 redundant controllers and a single (non-redundant) controller shown.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

As used herein an industrial process facility runs an industrial process involving a tangible material that disclosed embodiments apply. For example, oil and gas, chemical, beverage, pharmaceutical, pulp and paper manufacturing, petroleum processes, electrical, and water. An industrial process facility is distinct from a data processing system that only performs data manipulations.

Figure 2:
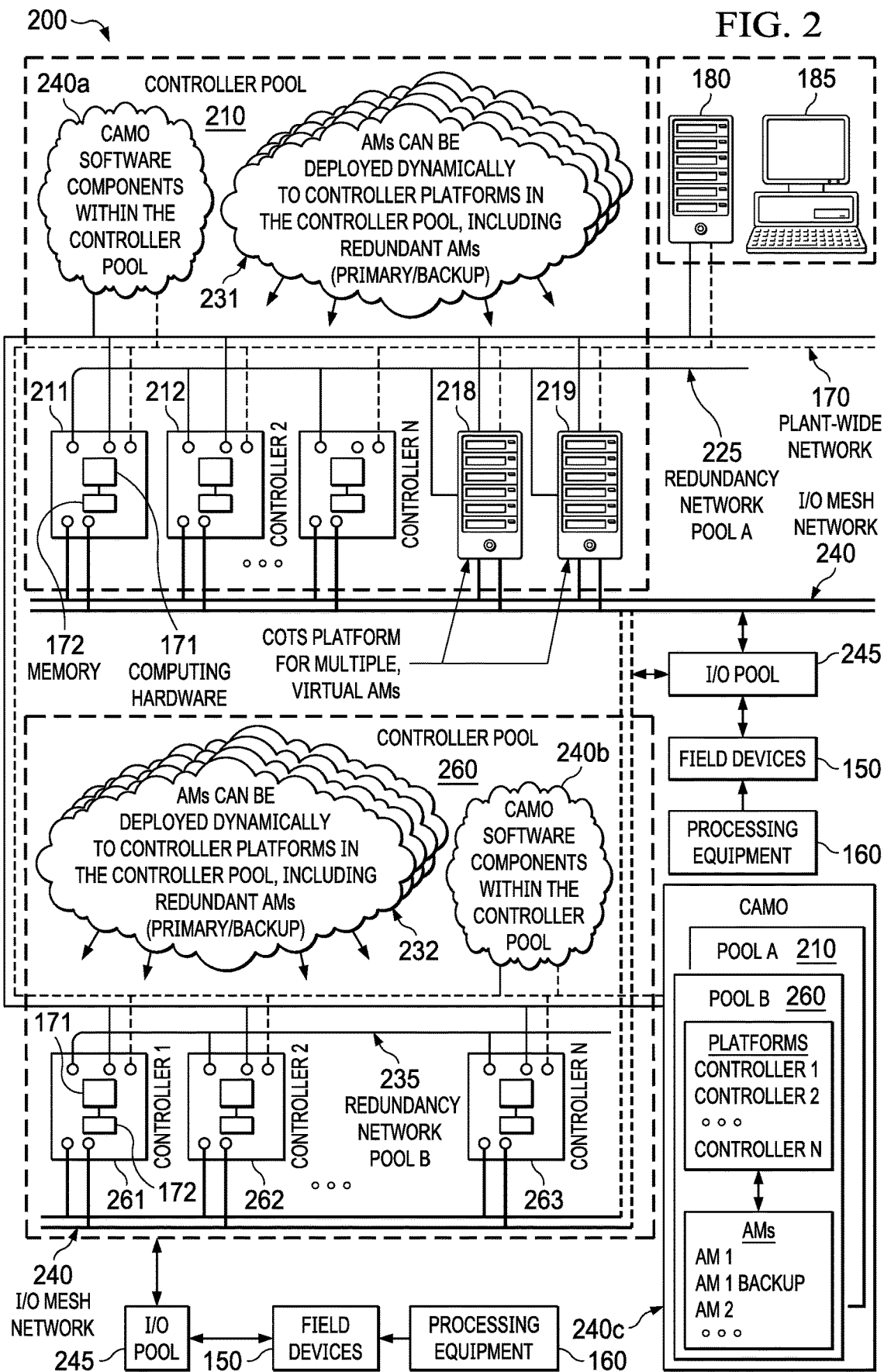
FIG. 2 shows an example an example process control system implementing a disclosed CAMO, where the AMs are flexibly deployed by the CAMO including two other than in a 1:1 fashion to the controller platforms, showing a plurality of controller platforms with a lower number of AMs, and where the controllers in a controller pool besides sharing AMs that are backed-up by at least one second type controller having a second hardware architecture shown as COTS controllers.

FIG. 2 shows an example process control system 200 comprising a first controller pool 210 and a second controller pool 260, where the process control system 200 includes a disclosed CAMO shown by example as being distributed comprising CAMO portions 240a, 240b, 240c for flexibly deploying, including dynamic deployment, of what is termed primary AMs shown by example as AM 231 and AM 232, that are all available to the respective controller platforms in the controller pools 210 and 260, respectively. Although two controller pools 210 and 260 are shown, only one controller pool is generally needed to practice disclosed aspects. As noted above, the primary AMs in AM block 231 and AM block 232 can also be provided to controllers outside of a controller pool.

The controller platforms in the respective first and second controller pools 210 and 260 are shown coupled to one another by a first redundancy network 225 and a second redundancy network 235. Each redundancy network 225, 235 has a sufficient speed for time synchronization and coordination for the respective controller platforms in the first controller pool 210, and for the controller platforms in the second controller pool 260.

The controller pools 210, 260 form an extensible set of hosts that provide resources. These controller pools 210, 260 are extensible because the total controller capacity can be increased by adding additional controllers that have the second hardware architecture that is different from the first hardware architecture. Each of the AMs shown as primary AMs 231, 232, on the other hand, is a software workload that is deployed to the controller pool. When a specific AM is redundant by creating a backup AM, it is then made up of two separate software workloads, a primary AM and a backup AM. Regarding the synchronization provided by the redundancy networks 225, 235, in order for a primary and backup AM in a controller platform to stay synchronized, the primary AM needs to send state and value data to the backup AM as it runs, so that the backup AM 'knows' exactly the state and values of the process to be able to take over for the primary AM at any time if it needs to.

Regarding controller pools, although shown in FIG. 2 having two controller pools 210, 260, disclosed arrangements may be applied to a single controller pool, or three or more controller pools. The first controller pool 210 is shown including first type controllers including controller 211, controller 212, and controller N, which all can be purpose-built embedded hardware platforms having a first hardware architecture type, and second type controller 218 and second type controller 219 with the second computing hardware architecture shown as comprising commercial COTS computing platforms.

The controller pool 260 includes controller 261, controller 262 and controller N shown as controller 263. The controllers have the first hardware architecture comprise computing hardware 171 having associated memory 172. Through disclosed translation and synchronization of AM state information, the second type controllers 218, 219 having the second hardware architecture also including computing hardware and associated memory, can join either of the controller pools 210, 260 that enables backing up the controllers having the first hardware architecture in the controller pool(s). After disclosed translation and synchronization of AM states and values, the second type controller(s) having the second hardware architecture, comprising second type controllers 218, 219 shown as COTS controllers, due to having a backup AM with the same states and values is able to assume the 'primary' AM's role and associated control mission should a fault occur on any of the first type controllers having the first hardware architecture.

The AMs in process control system 200 are shown as first AMs 231 associated with the first controller pool 210 and a second AMs 232 associated with the second controller pool 260. A plant-wide network shown as 170 (such as an Ethernet network) couples together the controllers in the respective controller pools 210 and 260, the CAMO 240a-c, and the AMs 231 and 232.

The CAMO 240a-c is configured to dynamically deploy to the AMs in each of the AMs 231, 232 to the computing platforms in their respective controller pools 210, 260, or when there is insufficient computing capacity in the controller pools 210, 260 to deploy AMs after disclosed AM state and value translation to the second type controllers 218 or 219. The CAMO 240a-c generally receives inputs to monitor plant topology and computing hardware and memory resources, and in the event of a controller failure the CAMO 240a-c automatically, or with optional user interaction, can perform functions such as to restore a new backup AM on a controller platform, a redundant backup controller on a controller platform, or a second type controllers 218, 219 having a second hardware architecture shown as COTS controllers. The CAMO can provide other responsibilities such as providing information to the user when deploying new AMs to allow the user to decide where AMs run by default, or which would allow the CAMO to make that decision.

The CAMO may be stored in any memory in the process control system 200, including a distributed arrangement with CAMO portions 240a, 240b within the controller pools 210, 260 shown in FIG. 2 as also including a portion shown as CAMO 240c that is outside the controller pools. There is thus as shown a CAMO component in each controller pool, and an additional CAMO component outside the controller pool that can be at the server level. The CAMO portion 240c may be stored at the server level with the server 180, and at least one Human-Machine Interface (HMI) 185 associated with the server 180, or even in the cloud if a reasonably low latency cloud arrangement can be provided.

The AMs 231 and 232 generally comprise a software 'container' for a control software application. The AMs which control software applications can be internally developed software (such as the Honeywell EXPERION CEE, or other advanced applications), or 3rd party applications. AMs can be inherently redundancy aware/capable (as is the case with the EXPERION CEE), or a conventional application that is not designed for redundancy.

The process control system 200 includes an I/O mesh network 240, connected between the controller pools 210, 260 and the I/O devices 245. The IO mesh network 240 is needed because the job of a controller is to process input data that comes from inputs including sensor inputs, and to make intelligent decisions about how to change the outputs that are coupled to actuators in order to govern the process itself, where the controllers communicate directly with the I/O devices 245. Although shown serving two controller pools 210 and 260, the I/O mesh network 240 can serve one controller pool, or three or more controller pools, or controllers outside of a controller pool.

Each controller pool 210 and 260 is thus a flexible pool of controller resources, for hosting a set AMs shown, that can be dynamically managed by a CAMO shown distributed as 240a and 240b in the first and second controller pools 210, 260, and a portion 240c outside of the controller pools 210, 260. In FIG. 2, the AMs 231 and 232 have thus been decoupled from the controller platforms (in contrast to being fixed in their assignment as shown in FIG. 1 described above) by the CAMO 240a, 240b, 240c such that each controller platform can assume the hosting of one or more AMs.

Upon the failure of a controller in a controller pool 210, 260, typically due to a hardware component failure, any primary AMs that were running inside of it will switchover to their backup AM running on another controller in the controller pool which resumes control albeit non-redundant after the failure. Any backup AMs running on that failing controller will cease to run, leaving their primary AM running elsewhere on the controller pool running, unaffected, but temporarily non-redundant. A new backup AM can be brought up automatically by the CAMO, with this new backup AM restoring the overall process control system 200 availability relatively quickly.

A disclosed CAMO for network control systems thus deploys AMs in a more flexible manner to the controller platforms. Deployment can be based on the preference of the user, including automatically, manually, or a mix of automatic and manual-based on the nature of the AM or failure scenario, mapping AMs to controllers in controller pools in one the following example non 1:1 ways.

As noted above the respective controllers in a controller pool 210, 260 besides sharing AMs are backed-up by at least one second type controller 218, 219 having a second hardware architecture shown as COTS controllers. Through disclosed translation and synchronization of AM state information, the second type controllers 218, 219 can join the controller pool, that enables backing up the first type controllers having the first hardware architecture in the controller pools 210, 260, after translation of the AM states and values, the controller(s) having the second hardware architecture due to having a backup AM being able to assume the 'primary' AM role and associated control mission should a fault occur on any of the first type controllers in the controller pools 210, 260 having the first hardware architecture.

Figure 3:
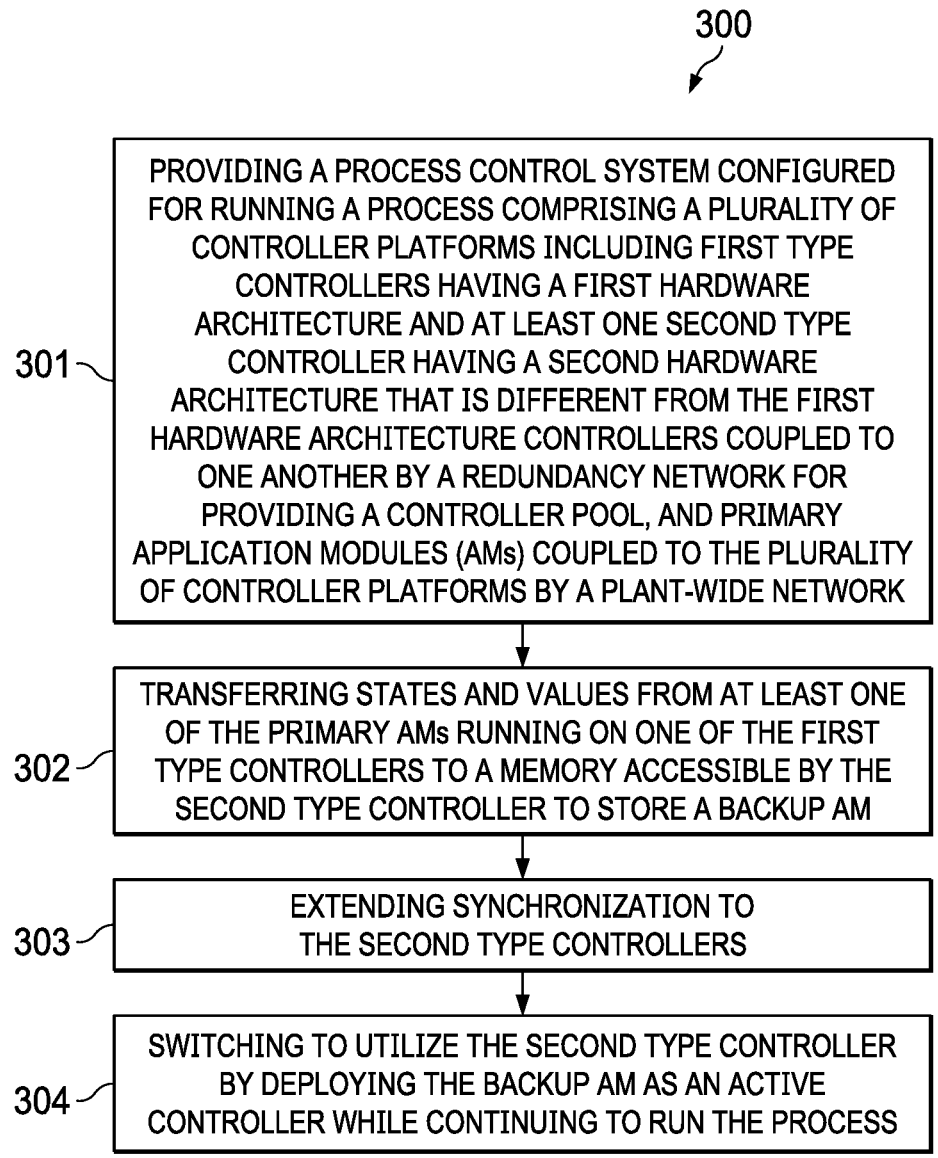
FIG. 3 is a flow chart that shows steps in a method of operating a process control system with a controller having a second hardware architecture as a backup to a controller having a first hardware architecture, according to an example embodiment.

Disclosed aspects also include a method to provide a controller backup with controllers having a second hardware architecture for controllers in a controller pool having a first hardware architecture. FIG. 3 is a flow chart that shows steps in a method 300 of operating a process control system with a controller backup comprising controllers having a second hardware architecture for backing up controllers in a controller pool(s) having a first hardware architecture, according to an example embodiment.

The method 300 comprises step 301 comprising providing a process control system 200 configured for running a process comprising a plurality of controller platforms including first type controllers having a first hardware architecture and at least one second type controller having a second hardware architecture that is different from the first hardware architecture controllers coupled to one another by a redundancy network 225, 235 for providing a controller pool (210, 260), an AMs 231, 232 comprising a plurality of AMs coupled to the plurality of controller platforms by a plant-wide network 170. As noted above, in the process control system there may also be controllers outside the controller pool besides second type controllers 218, 219, where the AMs can be deployed by the CAMO 240a, 240b, 240c to any of these controllers. The plurality of controller platforms are coupled by an I/O mesh network 240 to I/O devices to provide an I/O pool 245 coupled to field devices 150 that are coupled to processing equipment 160.

Step 302 comprises transferring states and values from at least one of the AMs running on one of the first type controllers to a memory accessible by the second type controller to store a backup AM. Step 303 comprises extending synchronization to a first of the second type controllers. Synchronization as described above refers to redundancy synchronization, whereby the state and data of the second type controller and at least one of the first type controllers are synchronized so that the second type controller is kept ready to take over as the active controller upon failure of one of the first type controllers, where this synchronization is needed to maintain redundancy.

With a disclosed CAMO and a controller pool, the redundancy is no longer for the entire controller, but rather for the AMs running on it. Accordingly, on the first type controllers in the case of a redundant controller arrangement in one example, one can have two AMs, one of which is a primary AM with a backup AM on a different controller (of the same or different hardware type) and the second AM can be a backup AM for an AM on a third controller that can be the same hardware type or a different hardware type. This is a significant difference between a disclosed CAMO-based controller pool vs a traditional 1:1 redundancy, where for traditional 1:1 redundancy there is only always one AM per controller, and the redundancy role (primary vs backup) of the AM and that of the controller are one and the same.

As noted above it is the CAMO that can provide the orchestration capability including synchronization to deploy the AMs to controllers in the network including the backup AMs. Step 304 comprises switching to utilize the second type controller by deploying the backup AM as an active controller while continuing to run the process.

Examples

Disclosed embodiments are further illustrated by the following specific Examples, which should not be construed as limiting the scope or content of this Disclosure in any way.

Disclosed methods are generally implemented by:
1. Extending the capability to run AMs, such as CEE or other software applications, on second type controllers having a second hardware architecture (such as COTS controllers) as compared to the first type controllers having the first hardware architecture.
2. Extending the CAMO functionality, both off-line and during run-time, to have awareness of the controllers having the second hardware architecture hosting AM(s) to gain the state value information needed to provide the awareness provided through a combination of provisioning/configuration and, given that, some automated discovery, and to exploit these second hardware architecture type controller(s) hosting AM(s) as backup resources when sufficient resources are no longer available on the first computing hardware type controllers, such as due to a node failure. An example node failure scenario can be when a controller node fails, and the primary applications and state and value information are then transferred to its hot backups, being another controller in the controller pool, but there may be insufficient controller resources at any particular time available to support new secondary workloads on the remaining controllers in the controller pool(s).
3. Extending the synchronization mechanism and failover mechanism to allow synchronization to second type controllers having a second hardware architecture, and failover from the failed first type controller having the first hardware architecture to a second type controller having the second hardware architecture when a controller node having the first hardware architecture running a primary workload fails. One can extend or modify the synchronization mechanism and failover mechanism by 1) allowing AMs on the first type controllers in the controller pool(s) to establish a redundancy relationship with AMs on second type controller(s) having the second hardware architecture type, provided all necessary capabilities required to host that AM including a backup AM are provided.

Also, as the first type controllers in the controller pool(s) having the first hardware architecture type are repaired/replaced, and thus sufficient compute capability is restored to the controller pool to have all primary functions and secondary functions of the AMs return to these first type controllers, then have the workload can be transferred back from the second type controllers back to one or more of the first type controllers in the controller pool. Such a transfer back can be user commanded. Being manually commanded enables operator control to what happens and when, and also allows observation of a direct cause and effect phenomena, which if it fails, is easily recognized and can be quickly addressed. Although a manual commanded controller transfer is generally performed, the transfer back from the second type controller to first type controllers can also be an automated transfer enabled by an authorization by the operator, or instead be fully automatic without any operator authorization.

Disclosed embodiments can be applied to generally any process control system. For example, for oil refining, chemical processing, or power generation.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:
1. A method, comprising:
providing a process control system configured for running a process comprising a plurality of controller platforms including first type controllers having a first hardware architecture and at least one second type controller having a second hardware architecture different from the first type controllers coupled to one another by a plurality of redundancy networks for providing a plurality of controller pools, and primary application modules (AMs) coupled to the plurality of controller platforms by a plant-wide network, wherein the plurality of controller platforms are coupled by an input/output (I/O) mesh network to I/O devices to provide an I/O pool coupled to field devices coupled to processing equipment, the method comprising:
translating, as a first translation by the first type of controllers, states and values from at least one of the primary AMs into a hardware architecture independent format information;
transferring the states and the values from the at least one of the primary AMs running on one of the first type controllers to a memory accessible by the second type controller to store a backup AM,
wherein the transferring comprises sending the hardware architecture independent data format information to the memory accessible by the second type controller, to allow synchronization of the second type controller and the first type controllers;
translating, as a second translation by the second type controller, the hardware architecture independent data format information into an instruction set that is compatible with the second hardware architecture thereby extending synchronization to the second type controller; and
switching to utilize the second type controller by deploying the backup AM as an active controller while continuing to run the process using at least one of the redundancy networks, wherein the states and values of the second type controller and the first type controllers are synchronized so that the second type controller is ready to take over as the active controller upon failure of the first type controllers.

2. The method of claim 1, wherein the first hardware architecture comprises a PowerQUICC or an ARM architecture, and wherein the second hardware architecture comprises an X86 operating system (OS) architecture.

3. The method of claim 1, wherein at a first time the process is being exclusively controlled by the first type controllers, further comprising at a second time after the first time determining a data processing or memory insufficiency in the first type controllers, and then implementing the switching.

4. The method of claim 3, further comprising repairing or replacing at least one of the first type controllers to overcome the data processing or memory insufficiency, restoring all controller functions of the first type controllers, then idling the second type controller to transfer an entire controller workload back to the first type controllers.

5. The method of claim 1, wherein the plurality of controller platforms include at least one redundant controller arrangement.

6. The method of claim 1, wherein the switching is performed at least partially automatically.

7. The method of claim 1, wherein a controller application module orchestrator (CAMO) coupled to the plant-wide network implements at least the extending synchronization and the switching.

8. The method of claim 1, wherein the plurality of controller pools comprising a first controller pool and a second controller pool are coupled to one another by a first redundancy network and a second redundancy network of the plurality of redundancy networks.

9. The method of claim 1, wherein the plurality of controller pools is extensible by adding additional controllers that have the second hardware architecture that is different from the first hardware architecture.

10. A process control system for running a process, comprising:
a plurality of controller platforms including first type controllers having a first hardware architecture and at least one second type controller having a different second hardware architecture coupled to one another by a plurality of redundancy networks for providing a plurality of controller pools;
primary application modules (AMs) coupled to the plurality of controller platforms by a plant-wide network, wherein the plurality of controller platforms is coupled by an input/output (I/O) mesh network to I/O devices to provide an I/O pool coupled to field devices coupled to processing equipment;
a translating device comprising computing hardware and memory in the at least one second type controller, for translating states and values received from at least one of the primary AMs running on one of the first type controllers to generate a backup AM that has an instruction set compatible with the second type controller;
a controller application module orchestrator (CAMO) comprising a software engine coupled to the plant-wide network, and wherein the CAMO using the software engine is configured to:
translate, as a first translation using the first type of controllers, the states and the values from at least one of the primary AMs into a hardware architecture independent format information;
transfer the backup AM to a memory of the second type controller,
wherein the transferring comprises sending the hardware architecture independent data format information to the memory accessible by the second type controller, to allow synchronization of the second type controller and the first type controllers;
translate, as a second translation using the second type controller, the hardware architecture independent data format information into the instruction set that is compatible with the second hardware architecture thereby extending synchronization to the at least one second type controller; and
switch to utilize the second type controller that deploys the backup AM as an active controller while continuing to run the process using at least one of the redundancy networks, wherein the states and values of the second type controller and the first type controllers are synchronized so that the second type controller is ready to take over as the active controller upon failure of the first type controllers.

11. The process control system of claim 10, wherein the first hardware architecture comprises PowerQUICC or an ARM architecture, and wherein the second hardware architecture comprises an X86 operating system (OS) architecture.

12. The process control system of claim 10, wherein at a first time the process is being exclusively controlled by the primary AMs, further comprising one of the first type controllers or the second type controller at a second time after the first time for determining a data processing or memory insufficiency in the first type controllers, and then implementing the switching.

13. The process control system of claim 12, wherein at least one of the first type controllers is repaired or replaced to overcome the data processing or memory insufficiency, to restore all controller functions of the first type controllers, then idling the second type controller to transfer an entire controller workload back to the first type controllers.

14. The process control system of claim 10, wherein the plurality of controller platforms include at least one redundant controller arrangement.

15. The process control system of claim 10, wherein the switching is performed at least partially automatically.

16. The process control system of claim 10, wherein the plurality of controller pools comprising a first controller pool and a second controller pool are coupled to one another by a first redundancy network and a second redundancy network of the plurality of redundancy networks.

17. The process control system of claim 10, wherein the plurality of controller pools is extensible by adding additional controllers that have the second hardware architecture that is different from the first hardware architecture.

18. A process control system for running a process, comprising:
a plurality of controller platforms including first type controllers having a first hardware architecture and at least one second type controller having a different second hardware architecture coupled to one another by a plurality of redundancy networks for providing a plurality of controller pools;
primary application modules (AMs) coupled to the plurality of controller platforms by a plant-wide network, wherein the plurality of controller platforms are coupled by an input/output (I/O) mesh network to I/O devices to provide an I/O pool coupled to field devices coupled to processing equipment;
a translating device comprising an emulation layer, computing hardware and memory in the at least one second type controller, for translating states and values received from at least one of the primary AMs running on one of the first type controllers to generate a backup AM that has an instruction set compatible with the second type controller;

a controller application module orchestrator (CAMO) comprises a software engine coupled to the plant-wide network, wherein the CAMO using the software engine is configured to:

emulate, using the emulation layer included in the second type controller, the first hardware architecture by performing a first translation so that the states and the values from the primary AM received in a memory accessible by the second type controller remains in a data format compatible with the first type controller;

translate, as a second translation using the second type controller, the states and values from the primary AM to utilize specific memory addresses embedded within the states;

transfer the backup AM to the memory of the second type controller; and switch to utilize the second type controller that deploys the backup AM as an active controller while continuing to run the process using at least one of the redundancy network wherein the states and values of the second type controller and the first type controllers are synchronized so that the second type controller is ready to take over as the active controller upon failure of the first type controllers.

* * * * *